United States Patent [19]

Brauneis

[11] Patent Number: 5,139,100
[45] Date of Patent: Aug. 18, 1992

[54] POINT-OF-SALE SCANNER/SCALE SYSTEM WITH SCALE ACTIVATION OF SCANNER

[75] Inventor: James E. Brauneis, Gig Harbor, Wash.

[73] Assignee: Point of Sale Data Products, Inc., Gig Harbor, Wash.

[21] Appl. No.: 650,083

[22] Filed: Feb. 4, 1991

[51] Int. Cl.[5] .................... G01G 19/40; G01G 23/18; G06K 15/00
[52] U.S. Cl. .................... 177/25.15; 177/45; 177/245; 235/383
[58] Field of Search .................... 235/383; 177/25.15, 177/45, 245

[56] References Cited

U.S. PATENT DOCUMENTS

| | | | |
|---|---|---|---|
| 4,656,344 | 4/1987 | Mergenthaler et al. | 235/462 |
| 4,716,281 | 12/1987 | Amacher et al. | 235/383 |
| 4,881,606 | 11/1989 | Halfon et al. | 177/126 |
| 4,959,530 | 9/1990 | O'Connor | 235/383 |

OTHER PUBLICATIONS

ICL, Inc.—Orion Scanner/Scale and Pop-Up Cash Drawer.
The Spectra Physics, Scanning-Scale-Model 760 SLS.

*Primary Examiner*—George H. Miller, Jr.
*Attorney, Agent, or Firm*—Robin, Blecker, Daley & Driscoll

[57] ABSTRACT

A scanner/scale system in which power to the scanner light source and/or motor is triggered by a weight placed on the scale and in which the scanner is situated between the load assemblies of the scale and the scale platter is situated above the scanner.

28 Claims, 4 Drawing Sheets

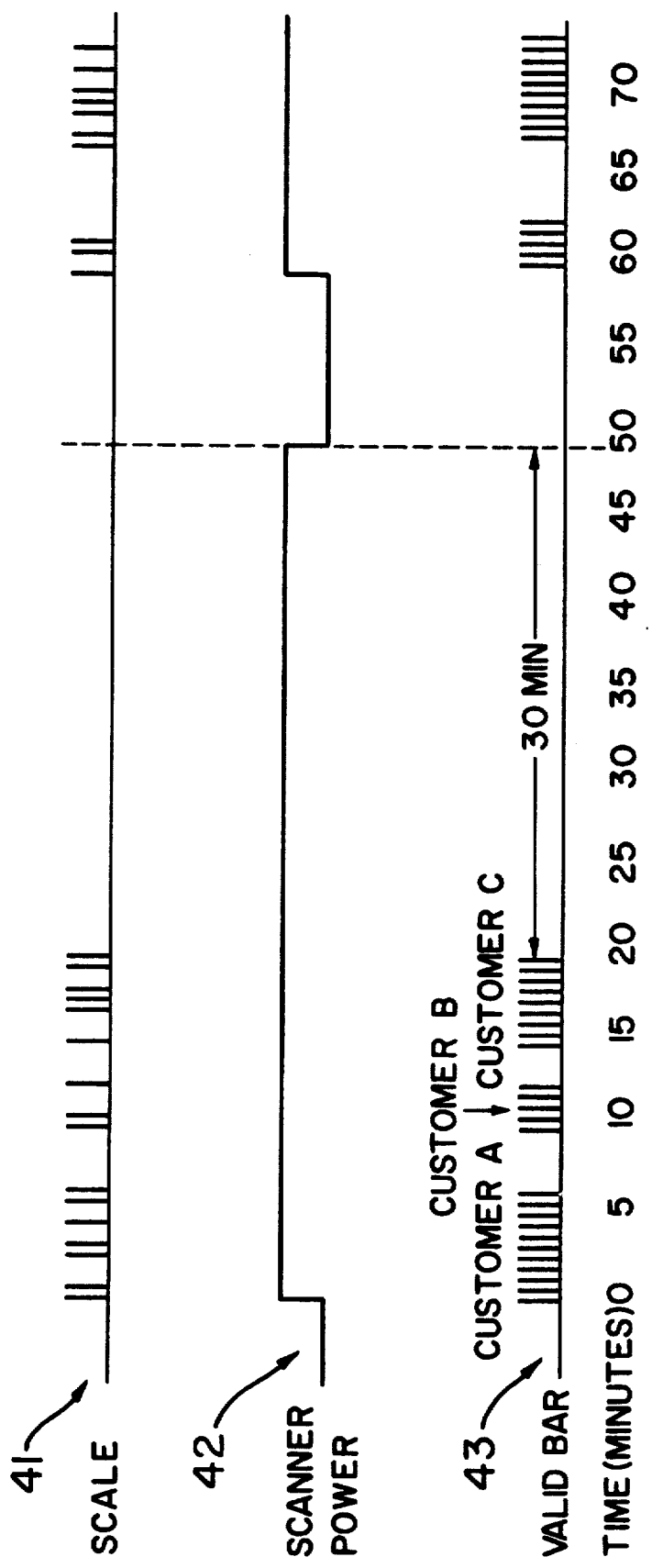

POINT-OF-SALE SCANNER/SCALE SYSTEM WITH SCALE ACTIVATION OF SCANNER

BACKGROUND OF THE INVENTION

This invention relates to point-of-sale systems and, in particular, to point-of-sale systems, which utilize both a scale and a scanner.

It is customary in supermarkets and certain other retail environments, where food is sold, to utilize a point-of-sale system having an optical scanner and a scale at designated checkout counters. Bar codes on objects or articles being purchased are read by the scanner so as to permit identification of the articles. Non-bar coded articles, priced per units of weight, are weighed by the scale and the total weight is communicated to the checkout terminal, which is situated at the checkout counter. The checkout terminal then computes the price of the article.

In most point-of-sale systems in present use, the scanner is physically separate from the scale. These separate locations require a checkout clerk to move articles a greater distance and perform more lifting. The combination of greater distance and fatigue increase the checkout time.

A number of checkout systems have been designed to alleviate the excessive handling and, hence, speed-up the check-out process. U.S. Pat. No. 4,881,606, issued Nov. 21, 1989, for "Point-Of-Sale Apparatus" discloses a weighing scale which is adapted to be placed directly over an optical scanner. Such placement of the weighing scale enables the operator to perform both the article weighing and article identification at the same time, thereby speeding up check-out time and reducing operator fatigue.

Other system have been designed in which the optical scanner and scale have been incorporated or combined into an integrated unit. These systems also allow for continual scanning and weighing at a central location, thereby likewise reducing check-out time. Examples of such integrated systems are NCR's Model 7824, Spectra Physics' Model 760 SLS and ICL/Datachecker's ORION scanner/scale units.

In addition to shorter check-out time, another concern in designing point-of-sale scanner/scale systems is to realize enhanced life expectancy of the system components. In the scanner portion of the system, there are two primary sources of failure. One is the laser tube, which typically degrades over a useful life ranging from ten thousand hours to twenty thousand hours. The other is the spindle motor used to rotate a mirror assembly which interacts with the laser to generate a scanning beam. The bearing of the motor wear and become noisy over a useful life ranging from eight thousand hours to fifteen thousand hours.

In present systems, increased life expectancy of these components is realized by shutting off the power to the components when the scanner is not in use. In most systems an on/off switch is provided and the operator is directed to turn the power off whenever the scanner is idle for a predetermined time period. However, in practice, this is frequently forgotten, resulting in continual scanner operation. There are also known scanners which contain logic to automatically power down critical components when no valid bar codes are detected over a predetermined time period. In one scanner of this type, the scanner is restarted by the operator pressing a manual restart button which is located on top of the scanner. In another scanner, the operator must make a scanning motion past a proximity detector.

It is, therefor, an object of the present invention to provide a scanner/scale system in which power is provided to the scanner components in an improved manner.

It is a further object of the present invention to provide a scanner/scale system in which power is provided to the scanner components in a way which improves their life expectancy and which reduces the need for conscious intervention by an operator.

It is yet a further object of the present invention to realize the above-stated objects in a scanner/scale system in which the scanner and scale are integrated into a single unit.

It is still a further object of the present invention to provide a scale for achieving the aforementioned objects.

SUMMARY OF THE INVENTION

In accordance with the principles of the present invention, the above and other objectives are realized in a scanner/scale system wherein application of power to at least the scanner light source and/or the scanner motor or both are triggered by the placement of a weight upon the system scale. Accordingly, the scanner is brought into its active or powered state simply by placing a weight upon the scale.

In the embodiment of the invention to be described hereinafter, the scale includes electronics for determining the weight of an article placed on the scale and for developing a trigger signal in response to a nonzero weight determination. The trigger signal is then provided to the scanner instructing the scanner to turn on, i.e., to enable power to be provided to the scanner light source and motor and any other components not receiving same.

In a further aspect of the invention, the scanner and scale arrangement is such that the scanner is situated in the space between and bordered by the scale load cell assemblies, with the scale platter being supported on the load cell assemblies in spaced relationship above the scanner.

BRIEF DESCRIPTION OF THE DRAWINGS

The above and other features and aspects of the present invention will become more apparent upon reading the following detailed description in conjunction with the accompanying drawings, in which:

FIG. 5 is a time chart showing the operation of the scanner/scale system of FIG. 2.

DETAILED DESCRIPTION

Figure 1:
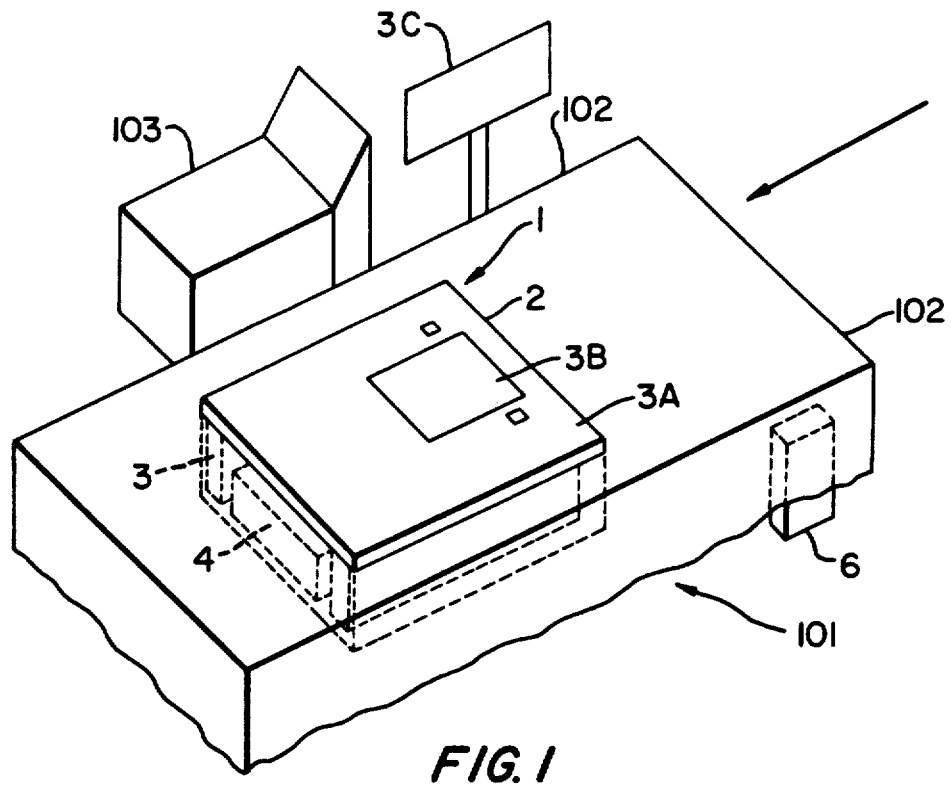
FIG. 1 illustrates a point-of-sale scanner/scale system in accordance with the principles of the present invention.

In FIG. 1, a supermarket checkout system 101 is shown. A checkout counter 102 supports a scanner/scale system 1 in accordance with the principles of the present invention. As shown, the scanner/scale system 1 comprises an integrated scanner/scale unit 2 having a scale 3 mounted around an optical scanner 4.

The scanner/scale unit 2 is mounted in the checkout counter 102 so that the top platter 3A of the scale 3 lies nearly flush with the top of the counter. A window 3B in the platter 3A allows passage of light to and from the window 4A (see, FIG. 2) of the optical scanner 4, thereby permitting scanning of articles placed on platter 3A.

A digital display 3C of the scale 3 is provided to display the weight of the articles placed upon the scale. A cash register terminal 103 of the checkout system 101 is attached to both the scanner 4 and the display 3C. The terminal 103 records the prices of articles checked out as a function of the scanned codes received from the scanner 4, the weight of the articles as provided by the scale 3 and product codes entered by keystroke.

Figure 2:
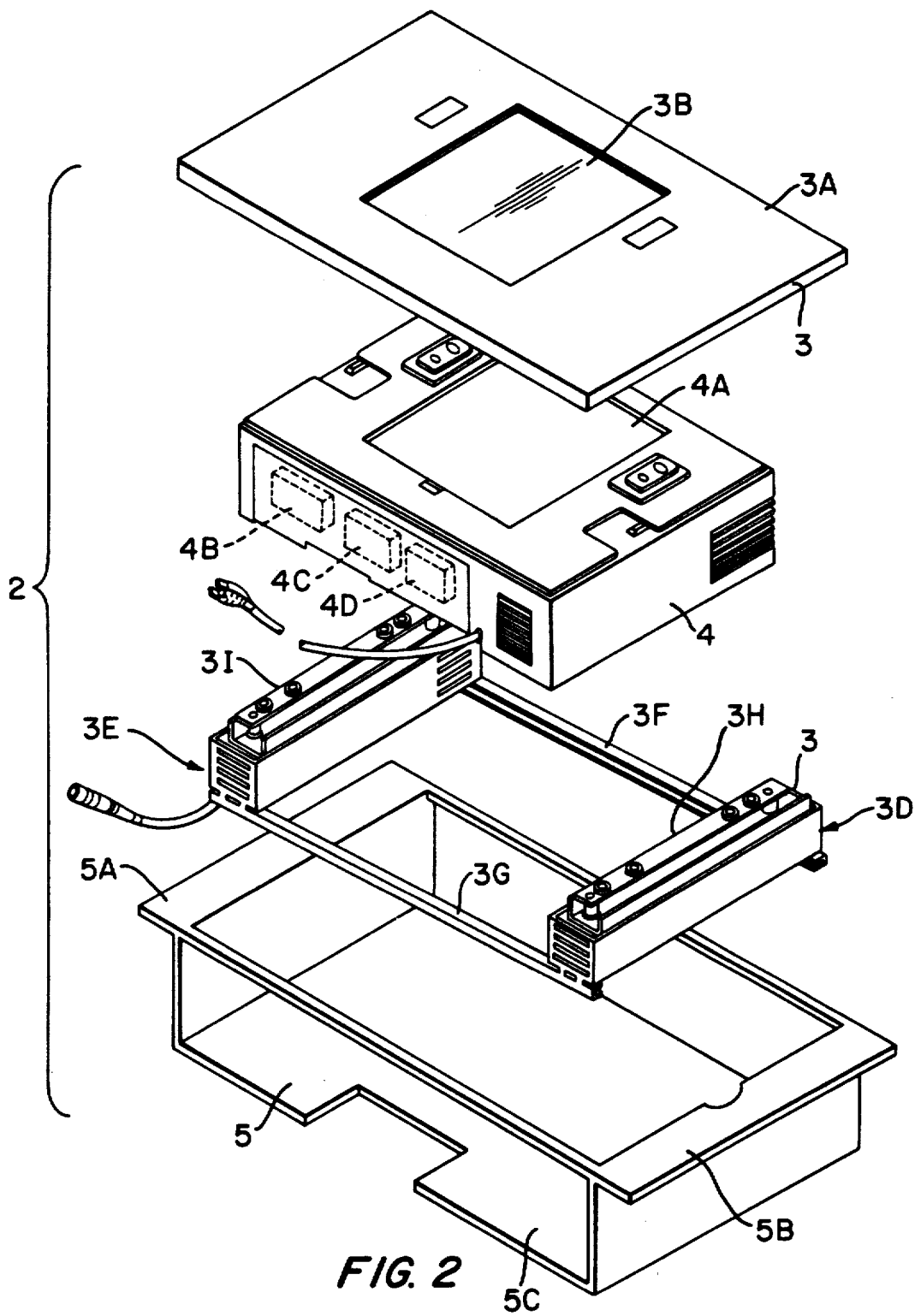
FIG. 2 shows the scanner/scale unit of the system of FIG. 1 in greater detail.

FIG. 2 shows an exploded schematic view of the scanner/scale unit 2. A main support housing 5 with ledges 5A, 5B, supports on its bottom surface 5C the scale 3 and the scanner 4. The scale 3 includes two load cell assemblies 3D and 3E whose bottom ends are connected by lateral beams 3F and 3G to form a rigid composite scale unit which surrounds the scanner 4. Supports 3H and 3I of the load cell assemblies carry the platter 3A so that it resides above and out of contact with the scanner 4.

The scanner 4 includes a light source 4B, preferably a laser, and a motor 4C for rotating a mirror assembly 4D of the scanner. This enables the scanner to develop a beam for interrogating the objects being scanned.

Figure 3:
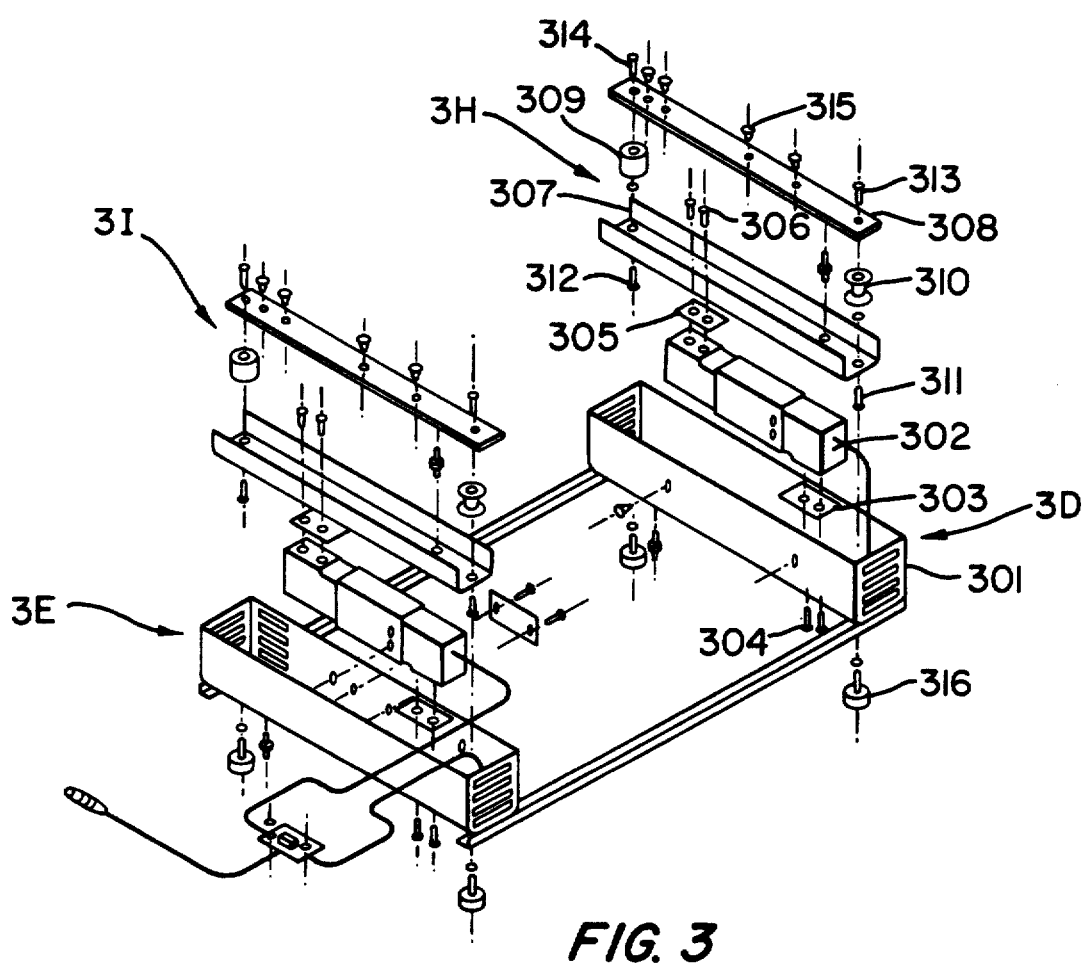
FIG. 3 shows the scale unit of the scanner/scale of FIG. 2 in greater detail.

FIG. 3 shows the load cell assemblies 3D and 3E and the support assemblies 3H and 3I of the scale 3 in greater detail. Each load cell assembly includes a platform base 301 which holds a load cell 302. A spacer or shim 303 is disposed between the bottom of one end of the load cell 302 and the base 301 and screws 304 hold the cell and shim to the base.

Another shim 305 is secured by screws 306 to the top of the other end of the load cell 302. A support beam 307 bears against the top of the load cell and a further support 308 for the platter 3A rests on the beam 307 via a ball bearing 309 at one end and a rubber shock absorber 310 at the other end. Screws 311 and 312 and screws 313 and 314 hold the supports 307 and 308, the ball bearing 309 and the shock absorber 310 together. Rubber elements 315 are held on the platter support 308 and interface with the platter 3A. Leveling legs 316 are secured to the bottom of the platform base 301 for leveling the assembly on the housing bottom 6C.

The scale 3 comprised of the load cell assemblies 3D, 3E can be realized by suitable modification of a standard scale, such as, for example, a Shekel SC150 scale. Likewise, the scanner 4 can be realized by suitable modification of a conventional scanner, such as, for example, a Fujitsu 3000 optical scanner.

Figure 4:
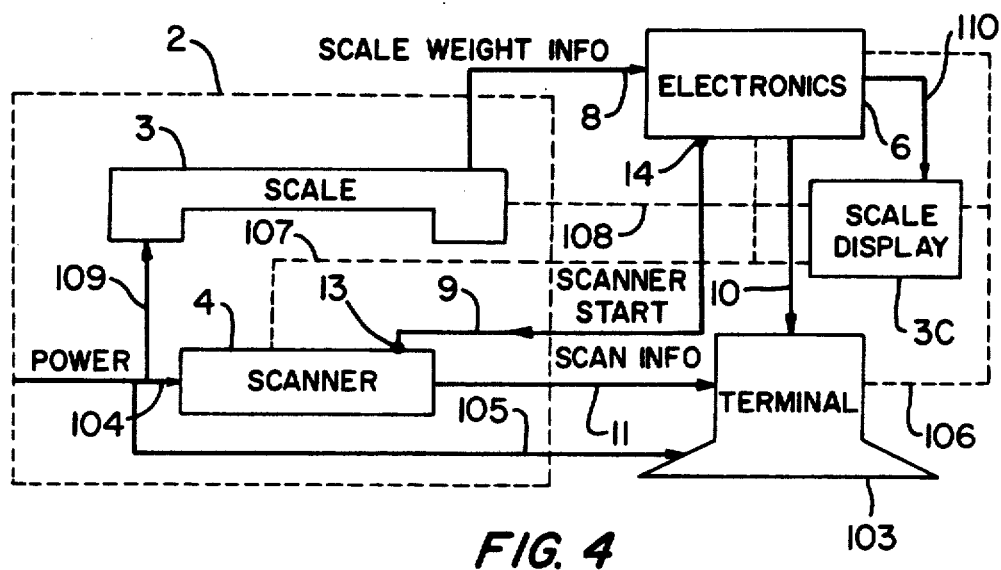
FIG. 4 shows the electrical interconnection of the components of the scanner/scale system of FIG. 1.

In accordance with the principles of the present invention, the scanner/scale system 1 of the invention is further adapted such that power to at least the laser light source 4B and/or the motor 4C of the scanner 4 is enabled or triggered in response to weight being placed on the scale 3. FIG. 4 illustrates the electrical connections and signaling amongst the scanner 4, scale 3, scale display 3C, scale electronics 6 and terminal 103, which allows such triggering to be realized.

More particularly, bar code information obtained by the scanner 4 is carried by a scan info connection 11 to the terminal 103. Scale weight information is passed from the scale 3 to the scale electronics 6 via a scale data connection 8. The scale electronics 6, in turn, passes weight information on weight info connection 10 to the terminal 103 and to the scale display 3C via the display connection 110. Scale electronics 6 also, in accord with the invention, generate at an output terminal 14 a scanner set or start trigger signal. This trigger signal is coupled to scanner start line 9 which conveys the signal to a scanner start input terminal 13. The terminal 13, in turn, controls the application of power to the scanner laser source 4B and scanner motor 4C.

Power is supplied to scanner 4 and terminal 103 via lines 104 and 105. Power is supplied to the display 3C and the scale electronics 6 via either the terminal 103 or the scanner 4 on lines 106 and 107 (both shown in dotted line) or via separate power lines. The scale 3 receives power from the display 3C on line 108 (shown in dotted line) or from a separate power line 109.

Operation of the scanner/scale system 1 proceeds as follows. A weight is placed on the platter 3A by the checkout clerk. This may occur as a result of the clerk placing his or her finger or an article on the platter. The placement of a weight on the platter 3A causes the scale electronics 6 to generate a start signal, as will be discussed more fully below. The generated start signal is coupled via output terminal 14 and line 9 to the scanner start input 13. The trigger signal at the input 13 instructs the scanner to apply power to the scanner laser 4B and to scanner motor 4C which causes rotation of the scanner mirror assembly 4D.

The scanner is thus placed in an active state and emits a set of scan lines from the interaction of the laser light and the rotating mirror. The scan lines project outwardly of the scanner window 4A, through the window 3B of the scale platter 3A. If a scan line encounters an object in the scan volume, the line is reflected back through the scale window 3B and scanner window 4A into the the scanner 4. The reflected light is then analyzed electronically to determine whether the light contains a valid bar code pattern.

If a valid pattern is detected, the number represented by the bar code is transmitted to the terminal 103 over the scan info connection 11. However, if a valid bar code is not detected for a predetermined period (for example 30 minutes), the scanner 4 is adapted to remove the power being provided to the scanner laser 4B and scanner motor 4C and any other scanner components having limited useful life.

This deactivates the scanner and the scanner continues in this inactive or powered down state until a weight is again placed on the platter 3A, causing scale electronics 6 to generate a further start signal. This signal, as before, causes the scanner 4 to return power to the laser light source 4B, the scanner motor 4C and any other powered down scanner components, thereby returning the scanner to its active state in which it is now able to scan articles.

As above-indicated, in the present illustrative case, the start signal is generated at the scale electronics 6. This occurs as follows. When weight is applied to the scale 3, the weight causes a mechanical deflection of the load cells in the load cell assemblies 3E and 3D. The load cells, in turn, generate a corresponding analog weight signal which is transferred over the scale data connection 8 to the scale electronics 6.

The scale electronics 6 contain an analog to digital converter which converts the analog weight signal into a digital value. Further, standard electronic components in the scale electronics 6 compute the weight associated with the digital value obtained and transmit, via the scale display connection 110, such weight information to the scale display 3C which in turn activates appropriate display elements to display the computed weight.

During this processing, the scale electronics 6 also develop the scanner start signal which appears at the output terminal 14 when a non-zero weight is determined and displayed. The start signal at the terminal 14 connects to the start input 13 of the scanner 4, causing power up of the scanner components as above-described. The scale electronics 6 can be set such that a start signal is generated only when a non-zero weight equal to or exceeding a predetermined minimal value, such as, for example, a value of one tenth of a pound, is determined or computed by the electronics. This prevents inadvertent power up of the scanner components, due to weight determinations which result from external conditions, such as, for example, wind draft.

FIG. 5 is a timing chart illustrating a representative example of the above-discussed operation of the scanner/scale system 2 of the invention. A time line, in five minute increments, is shown on the horizontal axis. The scale operation indicated at 41 is shown with a low level representing a zero weight measurement and a high level indicating a non-zero weight measurement. The detection of a valid bar code scan is shown at 43 with a high level representing the scanning and decoding of a valid bar code. The state of the power supplied to the scanning components of the scanner 4 is shown at 42 where a high level indicates that power is applied to the scanner components and a low level indicates the absence of power.

At time=0, a checkout procedure is initiated by applying articles to the scale 3 and power to the scanner 4.

From time=0 through time=20, an operator passes articles, containing bar code tags, through the scanner's field. The valid bar waveform 43 indicates each time a valid bar is received and decoded by the scanner. The scale operation waveform 41 indicates a high level each time an article is placed upon the scale and a non-zero weight value obtained. During this time period (Time=0 through Time=20), valid scans and non-zero weight measurements are grouped into three groups, each group representing a different customer (customer A–C). The voids (absence of valid bars and non-zero weights) between the groups indicate the time period in which the customer is paying for goods and packaging is occurring. A continuous count up timer, for example, having a predetermined upper limit (in this example 30 minutes) is contained within the scanner. The timer is reset to zero each time the scanner detects a valid bar code or the scale detects a non-zero weight. Therefore in the present case, from time=0 through time=20, the timer is reset often, never reaching the upper limit of 30 minutes.

From time=20 through time=50, no customers are checking out. Therefore, the valid bar code indication 42 and the scale operation 41 are idle. The timer, which was last reset by the final valid bar code or non-zero weight indication at time=20, continuously increments. At time=50, the timer reaches its upper limit of thirty minutes and removes the power to the scanner components as shown at 42. As can be appreciated, removing the power to the scanner components increases their life expectancy.

From time=50 through time=60, no customers are available and the system remains inactive. The scale continuously indicates a zero weight indication. The valid bar indication remains low due to the removed scanner power.

At time=60, a customer arrives and checkout sequence is initiated. An article is placed upon the scale by the operator, thereby resulting in a non-zero weight indication. A non-zero indication enables the scanner start signal at the scale electronics output 14. The scanner 4 receives, at the scanner start input 13, the start signal via the scanner start connection 9. The scanner, upon receiving the start enablement at the scanner start input, reinstates the power to the scanner laser, motor and other components accordingly.

At time greater than time=60, the scanner power remains on until a valid bar code or a non-zero weight is not detected for a thirty minute time period as previously discussed.

In all cases it is understood that the above-described arrangements are merely illustrative of the many possible specific embodiments which represent applications of the present invention. Numerous and varied other arrangements can readily be devised in accordance with the principles of the present invention without departing from the spirit and scope of the invention. For example, in the described embodiment, the scale 3 and the scanner 4 were integrated into a single unit. Alternatively, the scale can be positioned remote from the scanner and still provide the scanner start signal.

What is claimed is:

1. A scale for use in weighing articles and adapted to be used with a scanner for scanning the articles and developing information relating to the articles, the scanner including a light source and/or a motor and a supply means for supplying power to these components, and adapted to be connected to a power source, the scale, comprising:

means for weighing articles placed on said scale; and
means responsive to said weighing means for generating a trigger signal to be used to cause said supply means of said scanning source to enable power to be supplied to at least said light source and/or said motor of said scanner.

2. A scale in accordance with claim 1 wherein:
said light source is a laser source;
said scanner includes a mirror assembly arranged to interact with said laser light source;
and said motor is used to rotate said mirror assembly.

3. A scale in accordance with claim 1, wherein:
said weighing means comprises: means undergoing a mechanical deflection in response to an article placed on said scale and converting said mechanical deflection into an analog weight signal.

4. A scale in accordance with claim 3 wherein:
said means undergoing said mechanical deflection comprises one or more load cell assemblies.

5. A scale in accordance with claim 3, wherein:
said weighing means further comprises: processing means for converting said analog weight signal into a digital value corresponding to the weight of said article.

6. A scale in accordance with claim 5, wherein:
said weighing means further comprises: display means for displaying said digital value corresponding to the weight of said article.

7. A scale in accordance with claim 5, wherein:

said trigger signal generating means generates said trigger signal in response to said digital value representing a non-zero weight.

8. A scale in accordance with claim 1 wherein: said trigger signal generating means generates said trigger signal in response to said weighing means indicating a non-zero weight.

9. A scale in accordance with claim 8 wherein: said trigger signal generating means generates said trigger signal in response to said weighing means indicating a non-zero weight equal to or exceeding a predetermined value.

10. A scale in accordance with claim 9 wherein: said predetermined value is one tenth of a pound.

11. A scale in accordance with claim 1 wherein: said weighing means includes: first and second load cell assemblies arranged in spaced apart relationship; a platter mounted above and in force transmitting relationship to said first and second load cells assemblies, said platter receiving articles to be weighed and having a window to permit the transmission of light into the space between said load cell assemblies;

and said scale being adapted to be mounted with said scanner such that the space between said load cells is occupied by said scanner and said platter is supported above said scanner.

12. A scanner/scale system adapted to scan and weigh articles, comprising:
means for scanning articles to determine information about the articles, said scanning means including a light source and/or motor and supply means for supplying power to said light source and/or motor and adapted to be connected to a power source;

and a scale comprising: weighing means for weighing articles; and means responsive to said weighing means for generating and coupling a trigger signal to said scanning means to cause said supply means of said scanning means to enable supply of power to at least said light source and/or motor of said scanning means.

13. A scanner/scale system in accordance with claim 12 wherein:
said light source is a laser light source;
said scanner includes a mirror assembly for interacting with said laser light source;
and said motor rotates said mirror assembly.

14. A scanner/scale system in accordance with claim 12 wherein:
said weighing means comprises: means undergoing a mechanical deflection in response to an article placed on said scale and converting said mechanical deflection into an analog weight signal.

15. A scanner/scale system in accordance with claim 14 wherein:
said means undergoing said mechanical deflection comprises one or more load cell assemblies.

16. A scanner/scale system in accordance with claim 14 wherein:
said weighing means further comprises: processing means for converting said analog weight signal to a digital value corresponding to the weight of said article.

17. A scanner/scale system in accordance with claim 16, wherein:
said weighing means further comprises: display means for displaying said digital value corresponding to the weight of said article.

18. A scanner/scale system in accordance with claim 16, wherein:
said trigger signal generating means generates said trigger signal in response to said digital value corresponding to a non-zero weight of said article.

19. A scanner/scale system in accordance with claim 12 wherein:
said trigger signal generating means generates said trigger signal in response to said weighing means indicating a non-zero weight.

20. A scanner/scale system in accordance with claim 19 wherein:
said trigger signal generating means generates said trigger signal in response to said weighing means indicating a non-zero weight equal to or exceeding a predetermined value.

21. A scanner/scale system in accordance with claim 20 wherein:
said predetermined value is one tenth of a pound.

22. A scanner/scale system in accordance with claim 12 wherein:
said scanning means causes the supply of power to at least said light source and/or said motor of said scanning means to be stopped in the event said scanning means does not sense a valid article for a predetermined period of time.

23. A scanner/scale system in accordance with claim 12 wherein:
said scanning means comprises an optical scanner for reading bar code patterns.

24. A scanner/scale system in accordance with claim 23 wherein:
said scanning means causes the supply of power to at least said light source and/or said motor of said scanning means to be stopped in the event said scanning means does not sense a valid bar code pattern for a predetermined period of time.

25. A scanner/scale system in accordance with claim 12 wherein:
said scanning and weighing means are formed as an integral unit.

26. A scanner/scale system in accordance with claim 12 wherein:
said weighing means includes: first and second load cell assemblies arranged in spaced apart relationship; a platter mounted above and in force transmitting relationship to said load cell assemblies, said platter receiving articles to be weighed and having a window to permit the transmission of light into the space between said load cell assemblies;

and said scale and scanner are mounted relative to one another such that the space between said load cell assemblies is occupied by said scanner and said platter is above said scanner.

27. A method of scanning and weighing articles comprising:
scanning articles to determine information about the articles, said scanning including applying power from a supply means to at least a light source and/or a motor for carrying out the scanning;

and weighing said articles including during said weighing generating a trigger signal for enabling said step of applying power.

28. A method in accordance with claim 27 wherein:
said step of applying power terminates each time the scanning step does not result in detection of a valid article for a predetermined period of time.

* * * * *